United States Patent
Korja et al.

(10) Patent No.: US 10,390,259 B2
(45) Date of Patent: Aug. 20, 2019

(54) DATA FORWARDING IN A MOBILE COMMUNICATIONS NETWORK SYSTEM WITH CENTRALIZED GATEWAY APPARATUS CONTROLLING DISTRIBUTED GATEWAY ELEMENTS

(75) Inventors: Pekka Juhani Korja, Kauniainen (FI); Johanna Heinonen, Espoo (FI); Wolfgang Hahn, Bergfelde (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 59 days.

(21) Appl. No.: 14/380,210

(22) PCT Filed: Feb. 28, 2012

(86) PCT No.: PCT/EP2012/053295
§ 371 (c)(1), (2), (4) Date: Aug. 21, 2014

(87) PCT Pub. No.: WO2013/127429
PCT Pub. Date: Sep. 6, 2013

(65) Prior Publication Data
US 2015/0023176 A1    Jan. 22, 2015

(51) Int. Cl.
H04W 28/06 (2009.01)
H04L 12/717 (2013.01)
H04L 29/06 (2006.01)
H04W 28/02 (2009.01)
H04W 40/20 (2009.01)
(Continued)

(52) U.S. Cl.
CPC ........... *H04W 28/065* (2013.01); *H04L 45/42* (2013.01); *H04L 69/08* (2013.01); *H04W 28/0273* (2013.01); *H04W 40/20* (2013.01); *H04W 76/12* (2018.02); *H04W 88/16* (2013.01)

(58) Field of Classification Search
CPC ................................... H04W 28/065
See application file for complete search history.

(56) References Cited

U.S. PATENT DOCUMENTS

| | | | |
|---|---|---|---|
| 2010/0202458 A1* | 8/2010 | Sato | H04L 69/04 370/392 |
| 2011/0075557 A1* | 3/2011 | Chowdhury | H04L 12/14 370/230 |
| 2012/0044935 A1* | 2/2012 | Hama | H04L 12/4625 370/389 |
| 2012/0069797 A1* | 3/2012 | Lim | H04W 28/18 370/328 |

(Continued)

OTHER PUBLICATIONS

International Search Report and Written Opinion dated Jul. 30, 2012 corresponding to International Patent Application No. PCT/EP2012/053295.

(Continued)

*Primary Examiner* — John D Blanton
(74) *Attorney, Agent, or Firm* — Squire Patton Boggs (US) LLP

(57) ABSTRACT

A gateway apparatus (3) of a mobile communications network system, which is a termination point of signaling messages of a first protocol generates a packet data unit including information relevant for communicating user data of a second protocol between an entity (1) of the first protocol and a network (5) of the second protocol, and transmits the packet data unit to a distributed gateway element (201) of plural distributed gateway elements for communicating user data in the mobile communications network system, according to a third protocol.

12 Claims, 6 Drawing Sheets

(51) Int. Cl.
*H04W 88/16* (2009.01)
*H04W 76/12* (2018.01)

(56) References Cited

U.S. PATENT DOCUMENTS

2012/0324442 A1* 12/2012 Barde ................... H04L 49/70
 718/1
2013/0054761 A1* 2/2013 Kempf ............... H04L 12/4633
 709/220

OTHER PUBLICATIONS

OpenFlow Switch Specification, Version 1.0.0 (Wire Protocol 0x01), Dec. 31, 2009, 42 pages.

3GPP TS 29.281 V11.1.0 (Dec. 2011), Technical Specification, 3rd Generation Partnership Project; Technical Specification Group Core Network and Terminals; General Packet Radio System (GPRS) Tunnelling Protocol User Plane (GTPv1-U) (Release 11), Dec. 2011, 25 pages.

3GPP TS 29.274 V11.1.0 (Dec. 2011), Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), Dec. 2011, 202 pages.

3GPP TS 23.401 V11.0.0 (Dec. 2011), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Dec. 2011, 287 pages.

* cited by examiner

3GPP specified EPC:

S-GW:

P-GW:

OpenFlow controlled distributed EPC:

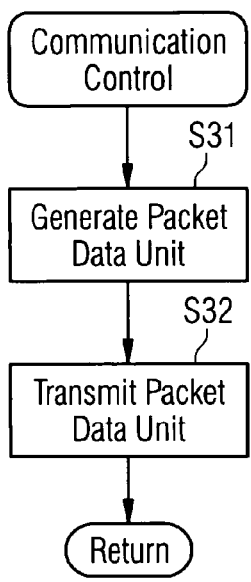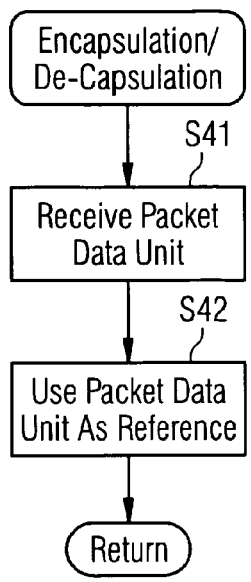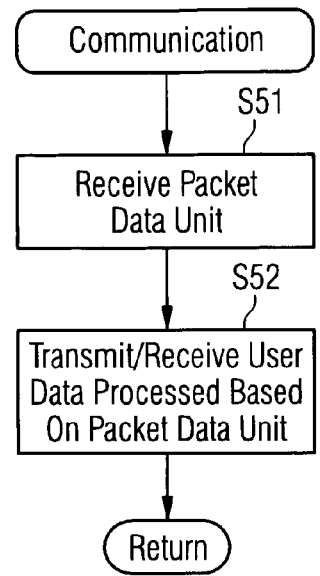
FIG 4A  FIG 4B  FIG 4C
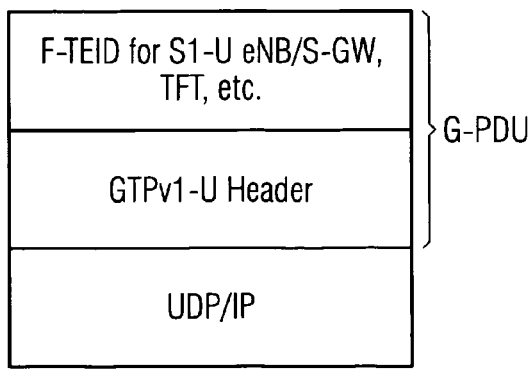
FIG 5

DATA FORWARDING IN A MOBILE COMMUNICATIONS NETWORK SYSTEM WITH CENTRALIZED GATEWAY APPARATUS CONTROLLING DISTRIBUTED GATEWAY ELEMENTS

BACKGROUND OF THE INVENTION

Field of the Invention

The present invention relates to data forwarding in a mobile communications network system with a centralized gateway apparatus which controls distributed gateway elements.

Related Background Art

Prior art which is related to this technical field can e.g. be found in

[1] OpenFlow Switch Specification Version 1.0.0, Dec. 31, 2009

[2] 3GPP TS 23.401 v11.0.0

[3] 3GPP TS 29.274 v11.1.0, Table 6.1-1 and section 8.21

[4] 3GPP TS 29.281 v11.1.0, sections 4.4.0, 5.1, 5.2 and 6.1

The following meanings for the abbreviations used in this specification apply:

3GPP third generation partnership project
CGI cell global identification
DMM distributed mobility management
ECGI EUTRAN cell global identification
EPC evolved packet core
EUTRAN evolved universal terrestrial radio access network
F-TEID fully qualified TEID
GPRS general packet radio service
GTP GPRS tunneling protocol
GW gateway
IP internet protocol
IETF internet engineering task force
LAI local area identification
LIPA local IP access
NW network
OF openflow
OSPF open shortest path first
PDU packet data unit
P-GW packet data network gateway
QoS quality of service
RAI routing area identification
SAI service area identification
S-GW serving gateway
SIPTO selected IP traffic offload
TAI tracking area identification
TEID tunneling endpoint identifier
TFT traffic flow template
UE user equipment
ULI user location information An expected significant data traffic growth and heterogeneous network capabilities are the challenges of future mobile networks.

Some of the resulting requirements for future network architecture will be an ability to master network heterogeneity, flexible deployment options supporting distributed gateways and service platforms, and the possibility to divide a physical network into several logical sub networks to allow NW sharing schemas.

Main recent technologies are network virtualization and programmable networks that promise cost efficiency of future networks. In particular the Open Flow protocol was designed to standardize a separation of control and user plane functions in transport networks. This allows cost savings for the following reasons:

Network nodes for routing and switching can become less expensive as they provide only simple standardized functionality The control plane can be centralized, this in turn allows less expensive network management for the operator decision making using information of the whole NW view having the control about the complete NW resources that allow for virtualization and NW resource sharing The control plane of the transport network can cooperate/can be combined with the mobile network control functions which allows further optimization of resource usage The current centralized EPC architecture means excessive traffic concentration on a single GW and possibly un-optimized routing. Offloading in 3GPP (LIPA/SIPTO) and distributed mobility management (DMM) in IETF are attempts to solve these problems. The first one leans on the current 3GPP specified mechanisms and DMM is based on (proxy) mobile IP protocol.

SUMMARY OF THE INVENTION

The present invention aims at enabling data tunneling in a mobile communications network system with a centralized gateway apparatus which controls distributed gateway elements.

This is achieved at least in part by the methods and apparatuses defined in the appended claims. The invention may also be implemented by a computer program product.

In the following the invention will be described by way of exemplary embodiments thereof with reference to the accompanying drawings.

BRIEF DESCRIPTION OF THE DRAWINGS

FIG. 4A shows a flow chart illustrating a process of communication control for enabling data tunneling according to an exemplary embodiment of the invention.

FIG. 4B shows a flow chart illustrating a process of encapsulation and de-capsulation for the data tunneling according to an exemplary embodiment of the invention.

FIG. 4C shows a flow chart illustrating a process of the data tunneling according to an exemplary embodiment of the invention.

FIG. 5 shows a schematic diagram illustrating an example of a packet data unit comprising information relevant for the data tunneling according to an exemplary embodiment of the invention.

DESCRIPTION OF THE EXEMPLARY EMBODIMENTS

A centralized gateway architecture offers visibility to network resources, while a distributed gateway architecture provides optimized routing. One possibility to have both in the same network architecture is to implement only data forwarding and (GTP) tunneling termination in distributed GW elements that are combined with OpenFlow controlled switches/routers and separate control plane functions from them. In this case a mechanism to send control information to the distributed GW elements is required. According to an exemplary embodiment of the invention, an OpenFlow protocol with some extensions may be used for this purpose.

Figure 1:
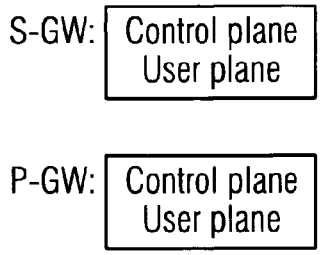
FIG. 1 shows a schematic diagram illustrating a functional split in OpenFlow controlled distributed EPC.
Figure 1:
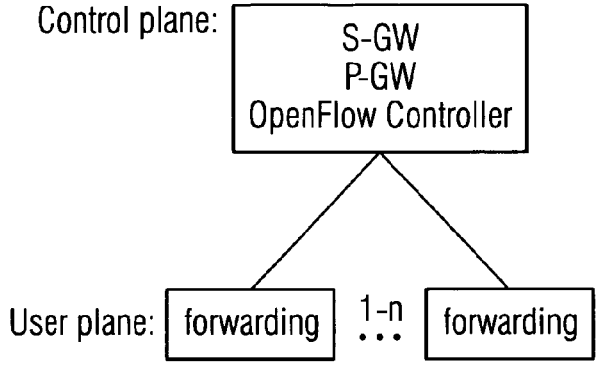

3GPP specification implements S-GW and P-GW functionalities that both include control plane operations as well as user plane handling, i.e. both the routing decisions and actual user data forwarding are implemented in the same elements as illustrated in FIG. 1 on the left. In OpenFlow controlled EPC a different kind of functional split may be more reasonable as illustrated in FIG. 1 on the right, where a centralized GW element which has a wide view about the network makes the routing decisions and inserts relevant flows to the distributed GW elements that do the packet forwarding. The OpenFlow controller is thus located in the centralized GW element on the control plane. The centralized GW element combined with a group of distributed GW elements can be seen as one logical entity, the intelligence and decision making is in the centralized part and physical interfaces together with packet forwarding and basic packet processing capability on the user plane is distributed.

The exemplary embodiments of the invention may be part of a framework that includes other concepts e.g. for combined control of mobility and routing function e.g. for GW relocation, central UE IP addresses assignment in a virtualized network, etc.

The centralized GW element is a termination point of 3GPP specified signalling. It keeps UE contexts, runs routing protocols (e.g. OSPF in SGi interface), etc. Centralized control minimizes the need for signalling between elements, e.g. GW relocation procedures may be simplified to only update routing in the distributed elements without any context transfers. OpenFlow gives a possibility to forward packets requiring special processing to elements that have relevant capabilities. In distributed EPC this feature can be beneficial in that packets of subscribers requiring e.g. lawful interception can be routed towards relevant nodes. The OpenFlow controlled distributed EPC architecture is presented in FIG. 2 showing base stations, e.g. eNodeBs, connected to distributed GW elements via S1 interfaces.

Figure 2:
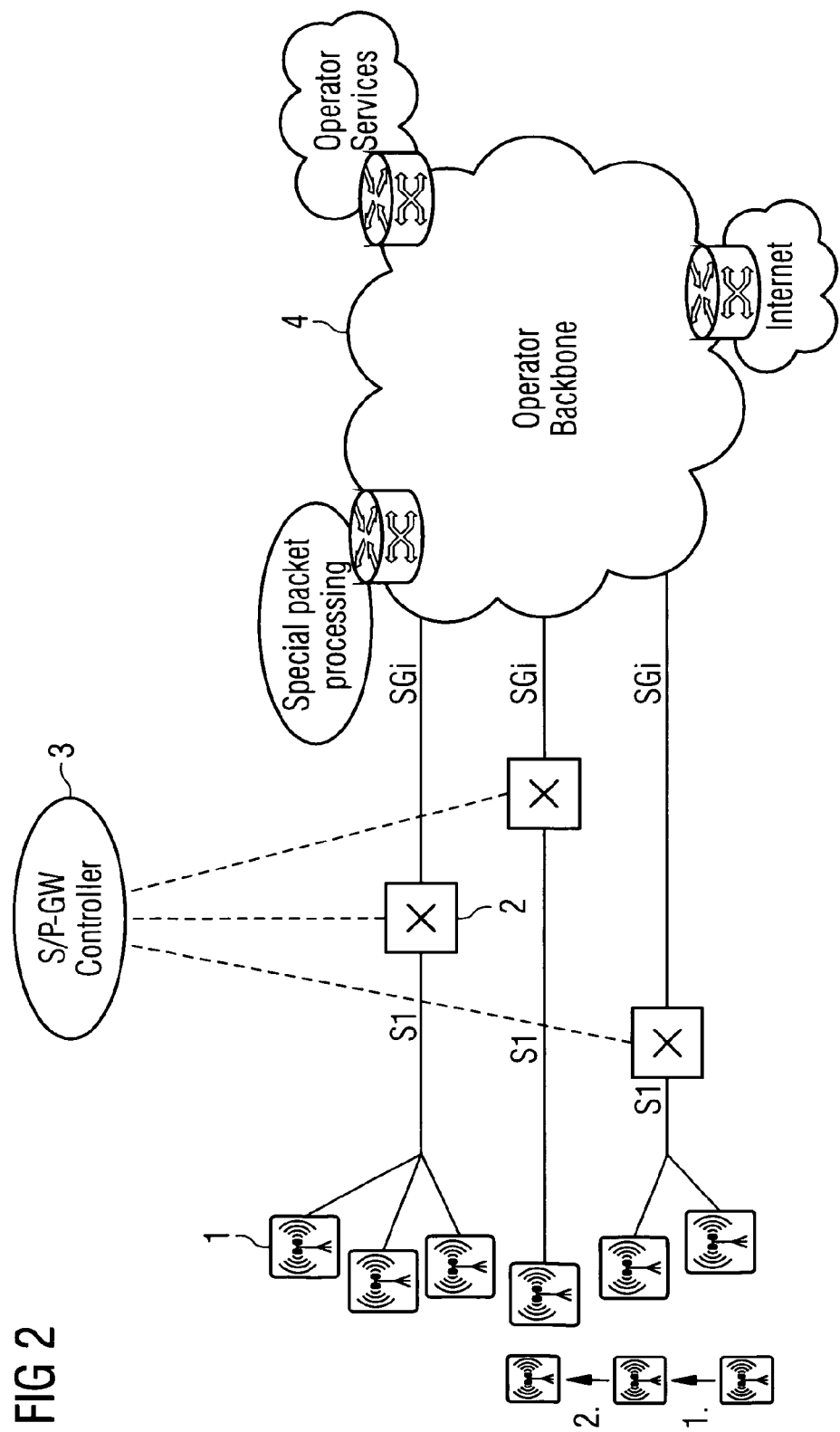
FIG. 2 shows a schematic diagram illustrating an OpenFlow controlled EPC.

For example, in FIG. 2, a base station 1, e.g. an eNodeB, is connected to a distributed gateway device 2 via S1 interface. The distributed gateway device 2 is controlled by an S/P-GW OpenFlow controller 3 via an OpenFlow interface/protocol, and the distributed gateway device 2 connects to an operator backbone 4 via SGi interface.

The distributed GW elements can be located in the core network, access network or co-located with eNBs. Also the capacity of each distributed GW element can be adjusted in an optimal way.

Figure 3:
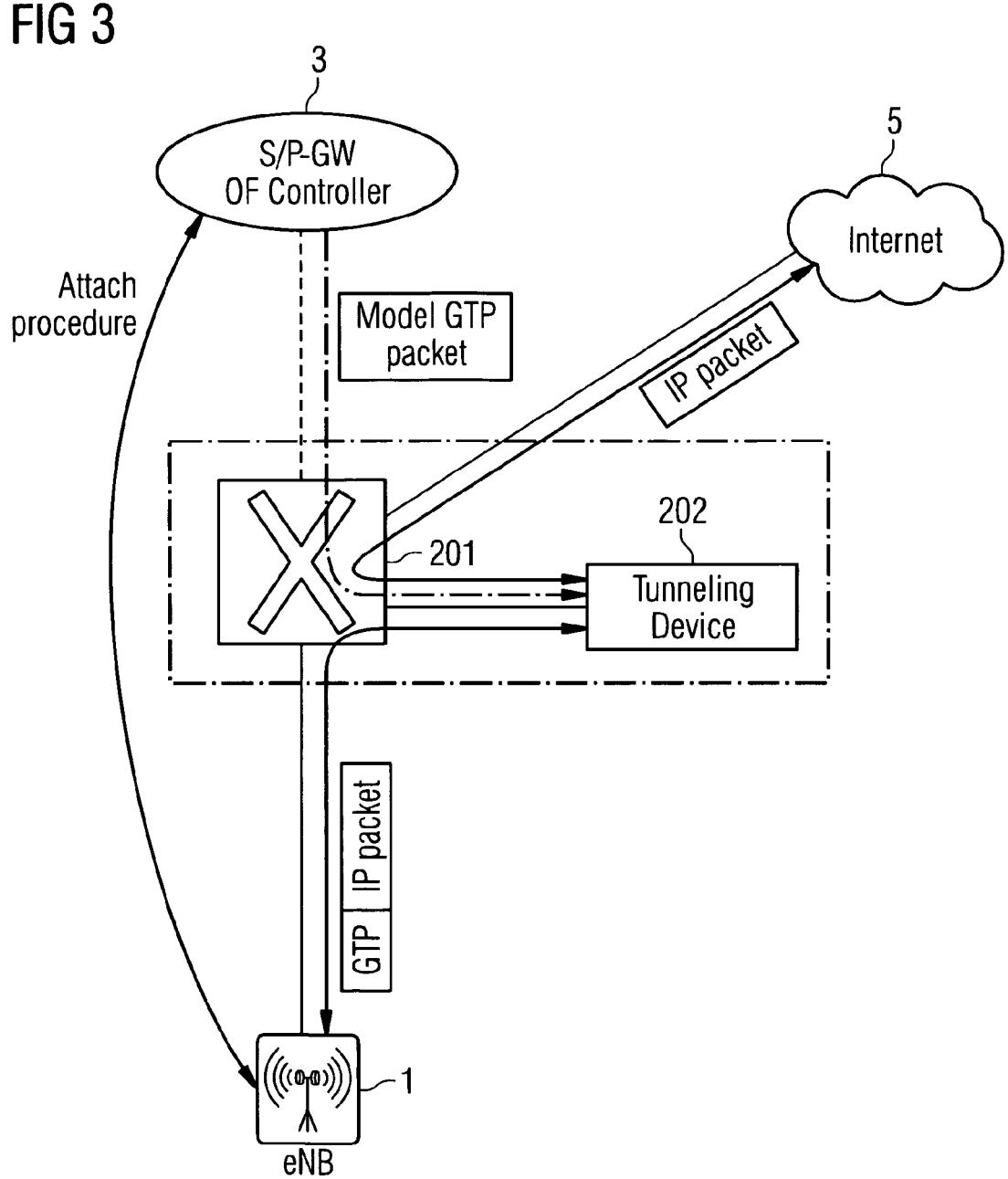
FIG. 3 shows a schematic diagram illustrating an example of GTP tunneling encapsulation/de-capsulation according to an exemplary embodiment of the invention.

During an attach procedure, standard 3GPP signaling messages may be terminated to the centralized S/P-GW OF controller 3 as shown in FIG. 3 by the arrow denoted by "attach procedure" from the eNB 1 to the S/P-GW OF controller 3. The S/P-GW OF controller 3 may utilize standard OpenFlow protocol to send information to distributed GW elements, e.g. a distributed GW element 30. Standard OpenFlow protocol is capable of transferring information related to protocol layers L2, L3 and L4.

Tunneling termination, e.g. GTP tunnel termination, and downlink packet buffering and optional other user plane related functions can be implemented in the distributed GW element 30. Therefore, relevant information required to encapsulate and decapsulate packets (e.g. GTP packets) needs to be transferred thereto from the S/P-GW OF controller 3. The problem here is that standard Openflow protocol is not capable of transferring information on application layer, e.g. GTP header information.

In current 3GPP release 8 specification, S/P-GW elements terminate 3GPP signalling related to bearer setup/handling. The same elements implement the user plane handling and GTP tunnelling termination as well. Therefore, there is no need to send this kind of information between elements.

In OpenFlow controlled EPC the benefits of both centralized and distributed architecture is to be optimized by separating the control plane from the user plane to the maximal extent possible.

As mentioned above, during an attach procedure the standard 3GPP signaling messages may be terminated to the centralized S/P-GW OF controller 3. Any of identity types available in ULI, i.e. LAI, ECGI, TAI, RAI, SAI and CGI, included in an attach request/create session request message can be used to select an appropriate distributed GW element. This way optimized routing can be achieved.

According to an exemplary embodiment, a packet data unit, e.g. a model GTP packet, may be used to transfer relevant tunneling related application layer information from the centralized gateway apparatus to the appropriate distributed gateway element. This information may be required by a (GTP) tunneling termination process and may comprise header information (e.g. GTP header information), a transport layer IP address, i.e. an eNB IP address towards which packets (e.g. GTP packets) are routed, a TFT and possibly other relevant information. As explained above the standard Openflow is not capable of transferring this information because it is above L4.

Referring to FIG. 4A, in a process of communication control, which may be performed by a gateway apparatus of a mobile communications network system, e.g. the S/P-GW OF controller 3, which may be a termination point of signaling messages of a first protocol (e.g. a GPRS protocol), a packet data unit including information relevant for communicating user data of a second protocol (e.g. IP) between an entity (e.g. an eNB) of the first protocol and a network (e.g. internet or intranet) of the second protocol may be generated in step S31. The packet data unit may be transmitted to a distributed gateway element of plural distributed gateway elements for communicating user data in the mobile communications network system, according to a third protocol (e.g. OF protocol) in step S32.

The distributed gateway element may be selected from the plural distributed gateway elements upon receiving a signaling message from the entity of the first protocol, wherein the signaling message relates to the user data.

The user location information may be acquired from the signaling message, and the distributed gateway element may be selected based on the user location information.

Figure 6:
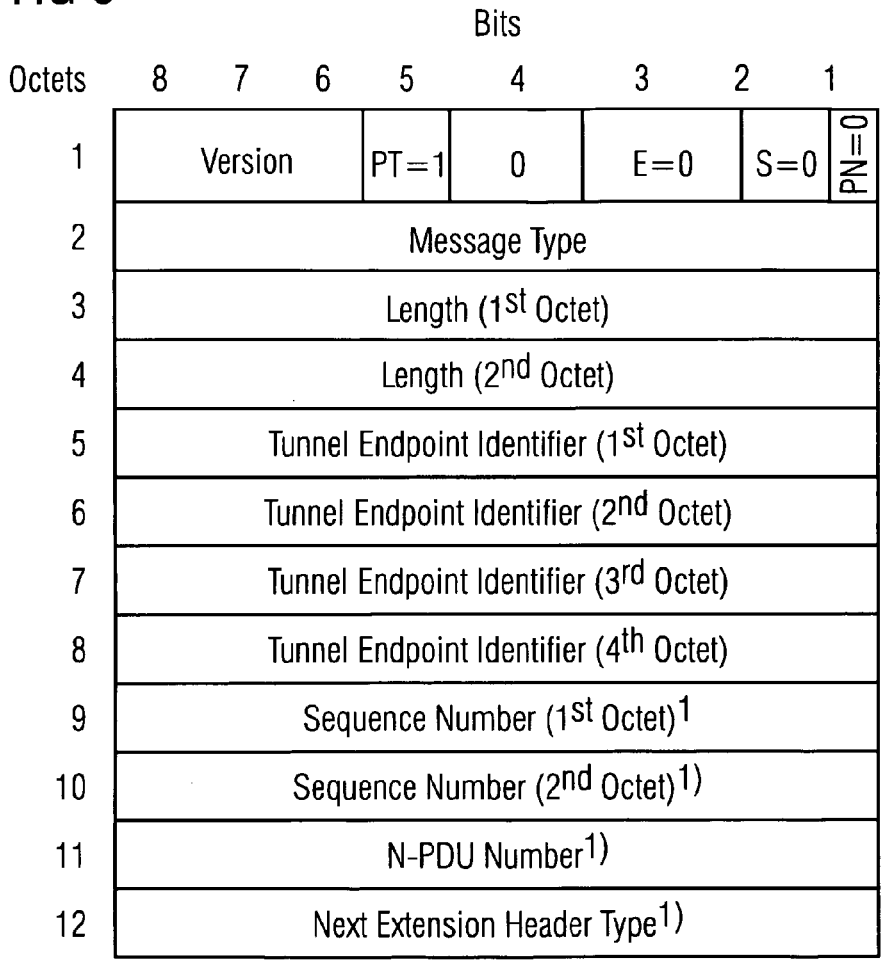
FIG. 6 shows a schematic diagram illustrating an example of a GTP header for OpenFlow controlled EPC according to an exemplary embodiment of the invention.

The packet data unit may be a model GTP packet and may be a G-PDU, i.e. a message type 255 carrying in the payload all required information elements needed for GTP tunnelling termination in the distributed GW element as illustrated in FIG. 5. This information includes at least an F-TEID for S1-U eNodeB/S-GW and a TFT. The G-PDU shown in FIG. 5 further comprises a GTPv1-U header as illustrated in FIG. 6.

The GTPv1-U header is a variable length header whose minimum length is 8 bytes. There are three flags that are used to signal the presence of additional optional fields: a PN flag, an S flag and an E flag. The PN flag is used to signal presence of N-PDU Numbers. The S flag is used to signal presence of GTP Sequence Number field. The E flag is used to signal presence of Extension Header field, used to enable future extensions of the GTP header, without the need to use another version number. If and only if one or more of these three flags are set, the fields Sequence Number, N-PDU and Extension Header shall be present. As shown in FIG. 6, since the E, S and PN flags are equal to 0, bytes 9 to 12 are not evaluated.

Moreover, a version field is used to determine the version of the GTP-U protocol. The version number shall be set to '1', and a protocol type (PT) bit is used as a protocol discriminator between GTP (when PT is '1') and GTP' (when PT is '0'). A message type field indicates the type of GTP-U message. A length field indicates the length in octets of the payload, i.e. the rest of the packet following the mandatory part of the GTP header (that is the first 8 octets). A tunnel endpoint identifier (TEID) field unambiguously identifies a tunnel endpoint in the receiving GTP-U protocol entity. A receiving end side of a GTP tunnel locally assigns the TEID value a transmitting side has to use.

Alternatively, instead of carrying the information required by the tunneling termination process in the payload as described above a new GTP-U extension header type may be defined for carrying the information discussed above, or a new GTPv2-C message type e.g. message type "240" with name "Openflow" could be defined for carrying the information discussed above.

The packet data unit, e.g. the model GTP packet, enables sending also other application level information elements received via 3GPP signaling or generated in the centralized gateway apparatus to the distributed gateway element according to the needs. This information may be related e.g. to QoS, charging characteristics, etc.

The tunneling termination in the distributed gateway element can be implemented e.g. with a separate line card—a tunneling device—that stores the information received in the packet data unit, e.g. the model GTP packet, and performs packet encapsulation/de-capsulation as illustrated in FIG. 3.

As shown in FIG. 3 and referring to FIG. 4B, a packet data unit (e.g. model GTP packet) including the information relevant for communicating the user data of the second protocol (e.g. IP) between the entity (e.g. eNB) of the first protocol and the network (e.g. internet or intranet) of the second protocol may be received in step S41 e.g. by a tunneling device 202 provided separately from a distributed GW element 201 via the distributed GW element 201.

In step S402, user data received in a first message (e.g. GTP packet including IP packet) from the entity may be de-capsulated e.g. by the tunneling device by using the information of the packet data unit as a reference, and user data received in a third message (e.g. IP packet) from the network may be encapsulated e.g. by the tunneling device into a fourth message (e.g. GTP packet including the IP packet) of the first protocol by using the information of the packet data unit as a reference. The information of the packet data unit may be stored e.g. in the tunneling device 202.

Step S42 may alternatively be performed by the distributed GW element in addition to step S52 described below, and may store the information of the packet data unit.

According to the example shown in FIG. 3, the distributed GW element may perform a communication process as illustrated in FIG. 4C, in which in step S51 the packet data unit (e.g. model GTP packet) may be received according to a third protocol from the gateway apparatus. The distributed GW element may provide the packet data unit to the tunneling device.

In step S52, the first message may be received from the entity and may be provided to the tunneling device. The user data de-capsulated by the tunneling device from the first message and provided to the distributed GW element may be transmitted in a second message of the second protocol provided by the tunneling device. The user data in the third message may be received from the network and provided to the tunneling device. The fourth message of the first protocol provided by the tunneling device, in which the user data is encapsulated, may be transmitted to the entity.

The tunnel termination as described above allows termination of 3GPP specific tunnelling as early as possible in the network and allows optimal IP routing above.

The user plane may be implemented with simple switches and GWs instead of complex gateways and, thus, network costs are reduced.

The OpenFlow controlled EPC separates data forwarding and GTP tunnelling termination from all control plane functions. Control plane has the full view about the network and based on that information it installs flows to the distributed GW elements. At the same time optimal routing and data offloading is achieved in the distributed GW elements.

The OpenFlow controlled EPC gives a possibility to maximize the benefits of the centralized architecture (visibility to the whole network) and the distributed architecture (optimized routing, scalability) at the same time, and according to the present invention additional information may be transferred to the distributed GW elements.

Figure 7:
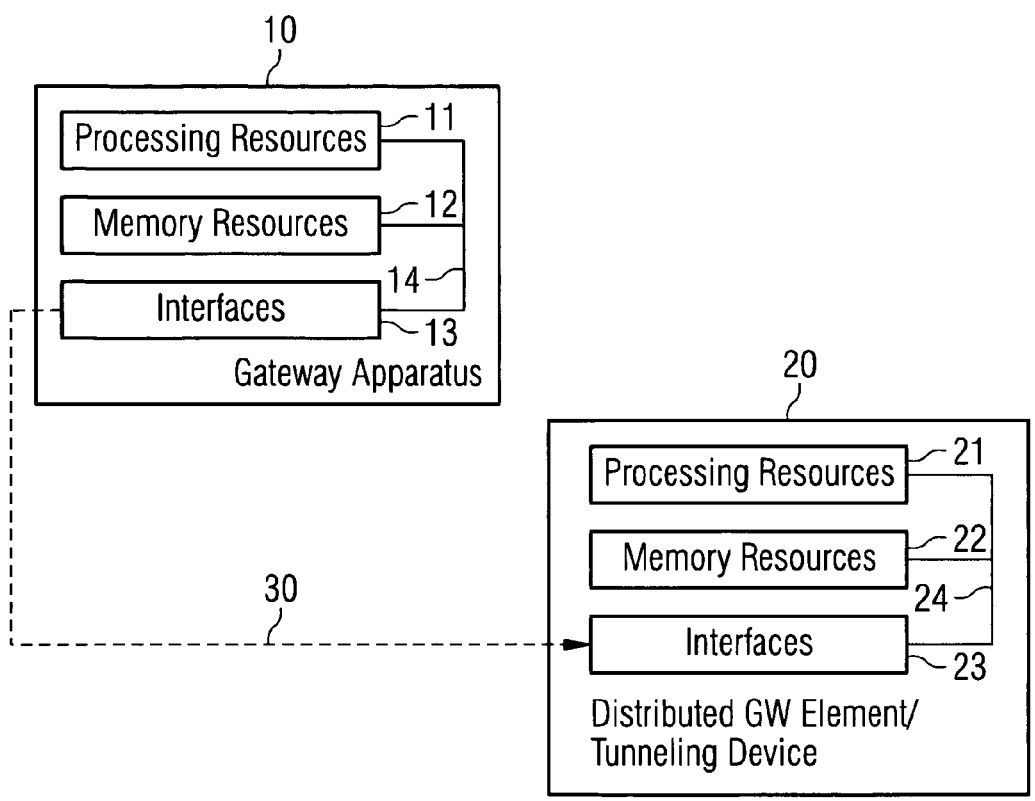
FIG. 7 shows a simplified block diagram of various electronic devices that are suitable for use in practicing the exemplary embodiments of this invention.

Now reference is made to FIG. 7 illustrating a simplified block diagram of various electronic devices that are suitable for use in practicing the exemplary embodiments of this invention.

A gateway apparatus 10 may comprise processing resources 11, memory resources 12 and interfaces 13 which may be connected by a link 14. The gateway apparatus 10 may comprise the S/P-GW OF controller 3 shown in FIG. 3 and/or may perform the process illustrated in FIG. 4A, by using the processing resources 11, memory resources 12 and interfaces 13.

A distributed GW element/tunneling device 20 may comprise processing resources 21, memory resources 22 and interfaces 23 which may be connected by a link 24. The distributed GW element/tunneling device 20 may comprise the distributed GW element 201 and/or the tunneling device 202 shown in FIG. 3 and/or may perform the processes illustrated in FIG. 4B and/or FIG. 4C, by using the processing resources 21, memory resources 22 and interfaces 23.

The gateway apparatus 10 may be connected to the distributed GW element/tunneling device 20 via a link 30 which may comply with an OF protocol. Via the link 30, the above-described packet data unit may be transmitted from the gateway apparatus 10 to the distributed GW element/tunneling device 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory resources 12, 22 may include programs assumed to include program instructions that, when executed by the associated processing resources 11, 21, enable the electronic device to operate in accordance with the exemplary embodiments of this invention, as detailed above.

In general, the exemplary embodiments of this invention may be implemented by computer software stored in the memory resources 12, 22 and executable by the processing resources 11, 21, or by hardware, or by a combination of software and/or firmware and hardware in any or all of the devices shown.

According to an aspect of the invention, a gateway apparatus, e.g. the gateway apparatus 10 shown in FIG. 7, which is a termination point of signaling messages of a first protocol, comprises means for generating a packet data unit including information relevant for communicating user data of a second protocol between an entity of the first protocol and a network of the second protocol, and means for transmitting the packet data unit to a distributed gateway element of plural distributed gateway elements for communicating user data in the mobile communications network system, according to a third protocol.

The gateway apparatus may comprise means for selecting the distributed gateway element from the plural distributed gateway elements upon receiving a signaling message from the entity of the first protocol, wherein the signaling message relates to the user data.

The gateway apparatus may comprise means for acquiring user location information from the signaling message, wherein the selecting means selects the distributed gateway element based on the user location information.

The means for generating, transmitting, selecting and acquiring may be implemented by the processing resources 11, memory resources 12 and interfaces 13 shown in FIG. 7.

According to a further aspect of the invention, an apparatus, e.g. the distributed gateway element/tunneling device 20 shown in FIG. 7, comprises first means for receiving a packet data unit including information relevant for communicating user data of a second protocol between an entity of a first protocol and a network of the second protocol in a mobile communications network system, and means for de-capsulating user data received in a first message from the entity by using the information of the packet data unit as a reference, and encapsulating user data received in a third message from the network into a fourth message of the first protocol by using the information of the packet data unit as a reference.

The means for receiving may receive the packet data unit according to a third protocol, wherein the apparatus may comprise second means for receiving the first message from the entity, wherein the apparatus may comprise first means for transmitting the de-capsulated user data in a second message of the second protocol, and third means for receiving the third message from the network and second means for transmitting the fourth message of the first protocol.

The apparatus may comprise means for storing the information of the packet data unit.

The first, second third means for receiving, the means for encapsulating and de-capsulating, the first and second means for transmitting and the means for storing may be implemented by the processing resources 21, memory resources 22 and interfaces 23 shown in FIG. 7.

According to a further aspect of the invention, an apparatus, e.g. the distributed gateway apparatus 20 of FIG. 7, comprises first means for receiving a packet data unit including information relevant for communicating user data of a second protocol between an entity of a first protocol and a network of the second protocol, according to a third protocol from a gateway apparatus of a mobile communications network system, the gateway apparatus being a termination point of signaling messages of the first protocol, second means for receiving a first message from the entity and first means for transmitting user data de-capsulated from the first message in a second message of the second protocol, and third means for receiving user data in a third message from the network and second means for transmitting a fourth message of the first protocol, in which the user data is encapsulated.

The first, second third means for receiving, and the first and second means for transmitting may be implemented by the processing resources 21, memory resources 22 and interfaces 23 shown in FIG. 7.

According to the above aspects, the packet data unit may comprise header information of the first protocol, an identification of a tunneling endpoint and a traffic flow template.

Moreover, the identification of the tunneling endpoint and the traffic flow template may be part of payload information of the packet data unit and the header information may be part of a header of the packet data unit.

In addition, the first protocol may be a general packet radio system protocol, the second protocol may be an internet protocol, and the third protocol may be an open flow protocol.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by a gateway apparatus of a mobile communications network system, the gateway apparatus being a termination point of signaling messages of a general packet radio system tunneling protocol, the method comprising:
   receiving a signaling message of the general packet radio system tunneling protocol from an entity of the general packet radio system tunneling protocol, wherein the signaling message relates to user data of an internet protocol;
   generating a packet data unit including information relevant for termination of the signaling message of the general packet radio system tunneling protocol;
   selecting a distributed gateway element from plural distributed gateway elements; and
   transmitting the packet data unit to the selected distributed gateway element, according to an OpenFlow protocol, wherein the packet data unit comprises header information of the general packet radio system tunneling protocol, an identification of a tunneling endpoint and a traffic flow template, and wherein the header information comprises a first flag signaling presence of packet data unit numbers, a second flag signaling a general packet radio system tunneling protocol sequence number field, and a third flag signaling presence of an extension header field.

2. The method of claim 1, comprising:
acquiring user location information from the signaling message; and
selecting the distributed gateway element based on the user location information.

3. The method of claim 1, wherein the identification of the tunneling endpoint and the traffic flow template are part of payload information of the packet data unit and the header information is part of a header of the general packet data unit.

4. A method, comprising:
receiving a packet data unit including information relevant for termination of signaling messages of a general packet radio system tunneling protocol, according to an OpenFlow protocol;
receiving a first message from an entity of the general packet radio system tunneling protocol;
de-capsulating user data received in the first message by using the information of the packet data unit as a reference;
transmitting the de-capsulated user data in a second message of an internet protocol to a network of the internet protocol;
receiving a third message from the network of the internet protocol;
encapsulating user data received in the third message into a fourth message of the general packet radio system tunneling protocol by using the information of the packet data unit as a reference; and
transmitting the fourth message of the general packet radio system tunneling protocol,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

5. The method of claim 4, comprising:
storing the information of the general packet radio service tunneling protocol (GTP) packet.

6. A computer program, embodied on a non-transitory computer readable medium, the computer program, when executed by a processor, causes the processor to:
receive a signaling message of the general packet radio system tunneling protocol from an entity of the general packet radio system tunneling protocol, wherein the signaling message relates to user data of an internet protocol;
generate a packet data unit including information relevant for termination of the signaling message of the general packet radio system tunneling protocol;
select a distributed gateway element from plural distributed gateway elements; and
transmit the packet data unit to the selected distributed gateway element, according to an OpenFlow protocol,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

7. A gateway apparatus of a mobile communications network system, the gateway apparatus being a termination point of signaling messages of a general packet radio system tunneling protocol, the gateway apparatus being configured to:
receive a signaling message of the general packet radio system tunneling protocol from an entity of the general packet radio system tunneling protocol, wherein the signaling message relates to use data of an internet protocol;
generate a packet data unit including information relevant for termination of the signaling message of the general packet radio system tunneling protocol;
select a distributed gateway element from plural distributed gateway elements; and
transmit the packet data unit to the selected distributed gateway element, according to an OpenFlow protocol,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

8. The apparatus of claim 7, configured to:
acquire user location information from the signaling message; and
select the distributed gateway element based on the user location information.

9. An apparatus configured to:
receive a packet data unit including information relevant for termination of signaling messages of a general packet radio system tunneling protocol, according to an OpenFlow protocol;
receive a first message from an entity of the general packet radio system tunneling protocol;
de-capsulate user data received in the first message by using the information of the packet data unit as a reference;
transmit the de-capsulated user data in a second message of an internet protocol to a network of the internet protocol;
receive a third message from the network of the internet protocol;
encapsulate user data received in the third message into a fourth message of the general packet radio system tunneling protocol by using the information of the packet data unit as a reference; and
transmit the fourth message of the general packet radio system tunneling protocol,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

10. The apparatus of claim 9, configured to:
store the information of the packet data unit.

11. A method comprising:
receiving a packet data unit including information relevant for communicating user data of an internet protocol between an entity of a general packet radio system tunneling protocol and a network of the internet protocol, according to an OpenFlow protocol from a gateway apparatus of a mobile communications network system, the gateway apparatus being a termination point of signaling messages of the general packet radio system tunneling protocol; and
receiving a first message of a general packet radio system tunneling protocol from the entity and transmitting user data de-capsulated from the first message in a second message of the internet protocol, and receiving user data in a third message of the internet protocol from the network and transmitting a fourth message of the general packet radio system tunneling protocol, in which the user data is encapsulated,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

12. An apparatus configured to:
receive a packet data unit including information relevant for communicating user data of an internet protocol between an entity of a general packet radio system tunneling protocol and a network of the internet protocol, according to an OpenFlow protocol from a gateway apparatus of a mobile communications network system, the gateway apparatus being a termination point of signaling messages of the general packet radio system tunneling protocol; and
receive a first message of a general packet radio system tunneling protocol from the entity and transmit user data de-capsulated from the first message in a second message of the internet protocol, and receive user data in a third message of the internet protocol from the network and transmit a fourth message of the general packet radio system tunneling protocol, in which the user data is encapsulated,
wherein the packet data unit comprises header information of the general packet radio system tunneling protocol, an identification of a tunneling endpoint and a traffic flow template, and
wherein the header information comprises a first flag signaling presence of packet data unit numbers, a second flag signaling a general packet radio system tunneling protocol sequence number field, and a third flag signaling presence of an extension header field.

* * * * *